INVENTOR.
PAUL E. STUCKERT

ATTORNEY

United States Patent Office 3,409,785
Patented Nov. 5, 1968

3,409,785
WIDE BAND ELECTRONICALLY VARIABLE LEVEL SHIFTER
Paul E. Stuckert, Katonah, N.Y., assignor to International Business Machines Corporation, Armonk, N.Y., a corporation of New York
Filed Nov. 10, 1965, Ser. No. 507,200
7 Claims. (Cl. 307—237)

ABSTRACT OF THE DISCLOSURE

A D.C. level shifter for insertion in a transmission line between a source and load wherein the shift ($E_O$) may be varied at will by concurrently varying two voltage sources of opposite polarity. In a preferred embodiment, the shifter comprises a pi resistance attenuator including three substantially non-reactive resistors, one of which is in series with one side of a transmission line and the other two are in series with said two voltage sources connected respectively across the line at opposite ends of said first resistance.

---

The present invention relates to an electronically variable D.C. level shifter whose operation is substantially frequency independent. More particularly, it relates to such a shifter utilizing two variable D.C. power sources and a plurality of substantially reactance free resistances wherein the input source is effectively isolated from the shifting circuitry and the load connected thereto.

In many current applications in the electronic industry there is a need for shifting the D.C. level of an output signal from one circuit to match the input characteristics of a second circuit. Prior art circuits for effecting D.C. level shifts are conventionally hampered by the fact that they either severely attenuate the input signal, improperly load the input source, or are limited in working bandwidth due to the presence of reactive elements in the circuitry. Further, in the majority of prior art level shifters the shift is fixed by a determination of the passive circuit elements and cannot be easily changed.

It has now been found that an efficient high speed variable level shifter may be fabricated utilizing two electronically variable power sources of opposite polarity and a number of substantially nonreactive resistances combined in a level shifting circuit configuration which will be described more fully subsequently. By electronically variable is meant that the level shift variations are attainable at electronic speeds, i.e., in the millisecond range or less.

It is accordingly a primary object of the present invention to provide a D.C. level shifter which is operable with signal inputs with frequency content ranging from D.C. well into the gigacycle range (1 gigacycle=$1 \times 10^9$ c.p.s.)

It is a further object of the present invention to provide such a level shifter wherein the magnitude of the shift or offset is electronically variable.

It is a further object of the present invention to provide such a level shifter wherein the input source is substantially free of effects from or interference due to the presence of the shifter.

It is another object of the invention to provide such a level shifter wherein the shifter does not draw any substantial current from the signal source.

It is a further object of the invention to provide such a level shifter comprising a pi attenuation network and two power sources of opposite polarity.

It is a further object of the invention to provide such a level shifter wherein said power sources are electronically variable.

It is a further object of the invention to provide such a level shifter which may be used as an interface between different logical circuit families having different D.C. level requirements.

The foregoing and other objects, features, and advantages of the invention will be apparent from the following more particular description of preferred embodiments of the invention, as illustrated in the accompanying drawings.

Figure 1:
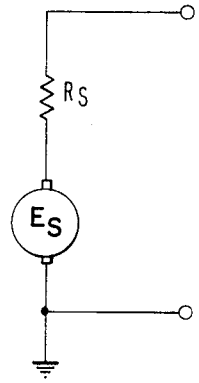
FIG. 1 is an equivalent circuit diagram of a typical source as would be used with the level shifter of the present invention.

The objects of the present invention are accomplished in general by a D.C. level shifting network for installation in a transmission line wherein the transmission line impedance ($Z_O$), and the load impedance ($R_L$) are substantially equal. A design feature of the invention is that there is no current ($I_1$) flowing in the transmission line when the source voltage ($E_S$) is zero. In a preferred embodiment the shifter comprises a first resistance ($R_3$) in series with one side of the transmission line, a second resistance ($R_1$) in series with a first D.C. voltage source ($E_1$) connected across said transmission line at the end of said first resistance closest to the source, a third resistance ($R_2$) in series with a second variable D.C. voltage source ($E_2$) connected across said line at the end of said first resistance closest to said load, said two D.C. voltage sources being of opposite polarity.

The various components of the present D.C. level shifter must satisfy the following relationships:

$$R_1 = R_2 = Z_0 \frac{K+1}{K-1} \tag{1}$$

$$R_3 = Z_0 \frac{K_2 - 1}{2K} \tag{2}$$

$$\frac{E_2}{E_1} = -K \tag{3}$$

$$E_1 = -2E_O \frac{K}{(K-1)^2} \tag{4}$$

In the above equations, K is a ratio of the attenuator input voltage (current) to its output voltage (current).

The above formulas indicating the relationships between the various elements of the present level shifter have been found necessary to successfully practice the invention.

Use of the present level shifter has been found to provide an exceptionally wide band level shifting capability with reasonable attenuation of the input signal provided proper resistances are used. The above formulas clearly and unambiguously set forth the required circuit relationships. The factors considered in arriving at these design criteria will be discussed more fully subsequently.

For the purposes of the following discussion, Formula 4 is the initial design formula for the present shifter. It is this formula in which the actual offset voltage $E_O$ is defined. It will, of course, be appreciated that with such a level shifter it will be known how much the level is to be shifted, or at least some general area within which such shift is to occur. Thus, by knowing the desired shift $E_O$ and by assigning a value to the voltage $E_1$ it is possible to solve Equation 4 for the value of K. Then, utilizing Formula 3, it is possible to solve for the value of $E_2$, utilizing the derived value of K and the previously assigned value of $E_1$. Proceeding obviously from here, it is possible to then determine the values of the resistances $R_1$, $R_2$, and $R_3$ utilizing Formulas 1 and 2. It will be appreciated that there are engineering tradeoffs involved since the value of $E_1$ may be chosen somewhat arbitrarily and inserted in Formula 4 together with an assigned value of $E_O$. Obviously the value of $E_1$ chosen will effect the value of K which in turn will effect the values of the resistances $R_1$, $R_2$, and $R_3$.

It will be noted that conventional forms of level shifters have been subject to the disadvantage that the variation of the D.C. level has been accompanied by changes in the peak-to-peak amplitude of the A.C. signal or in distortion of its waveform both of which are, of course, highly undesirable. Conversely, in prior level setters changes in the amplitude and frequency content of the A.C. signal has also resulted in a change of the D.C. level due to the interaction of the A.C. source and the D.C. level setting circuitry.

The present invention comprises a relatively simple circuit which permits selective adjustment of the D.C. level of a source supplied to a transmission line with minimal interaction between the D.C. level shifter and the signal source. Thus, utilizing the level shifting circuitry of the invention a change in the D.C. level has little effect upon the peak-to-peak amplitude or the waveform of the signal and further, a change in the amplitude of the signal has negligible effect upon the D.C. level.

Figure 4A:
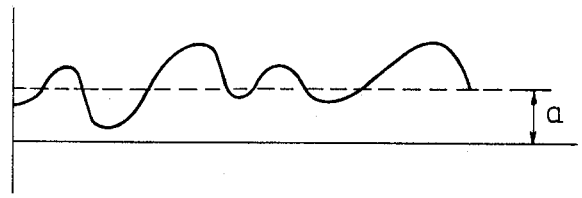
FIGS. 4a and 4b are graphs illustrating the effect of the level shifter of the present invention with and without an offset voltage $E_O$ added to the signal source.
Figure 4B:
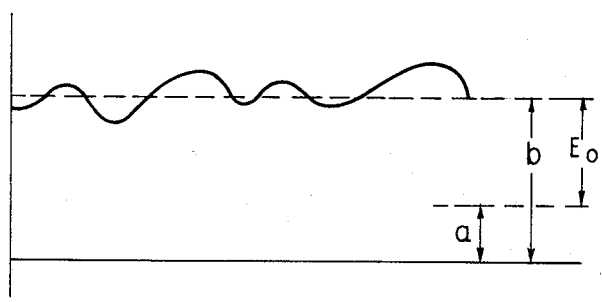

The waveforms of FIGS. 4a and 4b illustrate the effect of a level shift as anticipated by the present invention. FIG. 4a represents an A.C. signal with a steady state D.C. level of $a$.

FIG. 4b represents the same A.C. signal with a positive D.C. offset of $E_O$. Thus, the new D.C. level is $b=(a+E_O)$.

Figure 2:
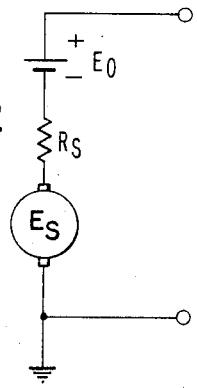
FIG. 2 is an equivalent circuit diagram showing the source and a shift voltage source $E_O$ for an ideal level shifter.

Having described the general objects, features, and advantages, the invention will now be described in detail with reference to the accompanying drawings. The equivalent circuit of FIG. 1 is exemplary of a typical signal source wherein the voltage source is represented by $E_S$ and the source impedance is represented by the lumped resistance $R_S$. Proceeding further, it is often desirable to be able to include a D.C. offset voltage of plus (+) or minus (−) $E_O$. The equivalent circuit of such a signal source modified with the offset voltage is shown in FIG. 2 wherein the voltage source $E_S$ and the lumped resistance $R_S$ are the same as in FIG. 1 but wherein the offset voltage is shown as a simple battery and designated $E_O$. As stated previously, it is desirable that the offset voltage $E_O$ be variable in both magnitude and direction. It is further desirable that the shifting network effect the frequency response and the transmissivity of the system as little as possible. It is finally desirable that the shifting network does not effect the operation of the signal source either by drawing current therefrom or by supplying current thereto, either of which may adversely effect the operation of the source.

Figure 3:
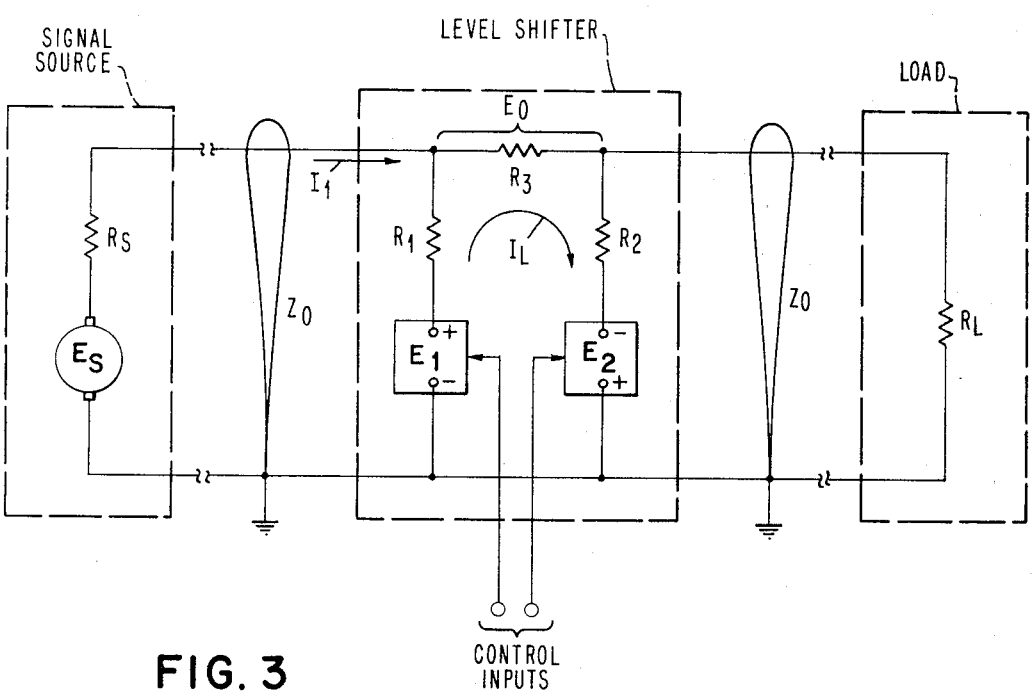
FIG. 3 is a schematic diagram of a preferred embodiment of the level shifter of the present invention including a signal source, a suitable transmission line, and a load.

Referring to the level shifting network set forth schematically in FIG. 3, in this system the conventional impedance matching of source, load, and transmission line is maintained so that $$R_S = Z_O = R_L$$

As with FIG. 1, $R_S$ and $E_S$ represent the signal source resistance and voltage and $R_L$ represents the load resistance. $E_1$ and $E_2$ are programmable D.C. voltage sources which together with the two resistances $R_1$ and $R_2$ and the single resistance $R_3$ comprise the level shifter of the present invention. The resistors $R_1$, $R_2$, and $R_3$ constitute a conventional pi attenuator network with the design equations set forth previously in Equations 1 and 2.

It will be appreciated that in the actual level shifter $E_O$ is produced by the current $I_L$ flowing through the resistor $R_3$. It should be further noted that with the polarities of $E_1$ and $E_2$ indicated in FIG. 3, that the polarity of the resultant offset voltage $E_O$ would be negative. This can readily be seen by referring to the Formula 4 wherein a positive $E_1$ will produce a negative $E_O$.

Assuming now that a desired level shift $E_O$ has been selected together with a given value for the power supply $E_1$, it will be remembered that the value of K, $E_2$ and the three resistors $R_1$, $R_2$, and $R_3$ may all be computed utilizing Formulas 1, 2, and 3. However, it will be noted that once a value for K has been derived utilizing Formula 4, the values of the three resistors $R_1$, $R_2$, and $R_3$ are established. Thus, with a given value for these three resistors whenever it is desired to change the offset voltage $E_O$, it is necessary to solve Equation 4 for a new value for $E_1$ wherein K is fixed and subsequently, solve for a new value of $E_2$ utilizing the computed value for $E_1$ and the fixed factor K.

Formulas 1 through 4 were derived utilizing standard Kirchoff's Law analysis, deriving appropriate simultaneous equations from said analysis and solving same utilizing known circuit parameters and relationships. The derivation is not presented here as it would be obvious to one skilled in the art.

It is apparent from examining the configuration of the present level shifting circuit set forth in FIG. 3 that said circuit is substantially free of both inductance and capacitance. This, of course, assumes the proper design of the resistive elements to minimize parasitic reactances. For this reason the circuit may be constructed with extremely wide bandwidth characteristics and it would only be in extremely high frequency areas where stray inductance and capacitance would be sufficiently large to become a problem.

The programmable power supplies $E_1$ and $E_2$ could be chosen from any of a wide variety currently available in the commercial market such as Trygon Electronics Model HR 20–1.5 (0–20 v.; 0–1.5 a.) or a Harrison Laboratories Model 865B (0–40 v; 0–0.5 a.). For apparent reasons, the power source regulation and resistor tolerances should be chosen to be consistent with the allowable variation in the level shift.

The following example indicates values for a typical set of level shifts $E_O$. In the example, it is assumed that the level shift is to be positive. The first value for $E_O$ and $E_1$ in the example represents the original selected value for both of these variables and $E_2$, $R_1$, $R_2$, and $R_3$ are computed by utilizing the aforementioned formulas. The pulse amplitude at both the source and load are included to indicate the amount of attenuation present for each of the level shifts. The power supplies selected for $E_1$ and $E_2$ in obtaining the data for the following example were two Trygon Electronics Model HR 20–1.5 power supplies. A Hewlett Packard 215A Pulse Generator was used as the source and a Tektronix 661 Sampling Scope was used to observe the output across the load. The pulse generator produced a pulse having a rise time of 1 nanosecond and the scope had a rise time of 0.35 nanosecond. Throughout the range of observation there was no significant change of the waveform between input and output due to the level shifting network. The pi attenuator network was made as follows:

$R_1 = R_2 =$ four 620Ω ½ watt carbon resistors in parallel;
$R_3 =$ three 150Ω and one 160Ω ⅛ watt carbon resistors in parallel.

In the above circuit the resistors were connected with minimal lead length and were mounted over a ground plane. The observed values of $E_O$, $E_1$, and $E_2$ and the resistor values are contained in the table below. The K value for this example was 2.

EXAMPLE

| $E_O$, Volts | $E_1$, Volts | $E_2$, Volts | K | $R_1$, Ω | $R_2$, Ω | $R_3$, Ω | $Z_O$, Ω | Source Pulse Amplitude, Volt | Load Pulse Amplitude, Volt |
|---|---|---|---|---|---|---|---|---|---|
| 0.5 | −2 | 4 | 2 | 153 | 153 | 38.2 | 50 | 1 | 0.5 |
| 1.0 | −4 | 8 | 2 | 153 | 153 | 38.2 | 50 | 1 | 0.5 |
| 1.5 | −6 | 12 | 2 | 153 | 153 | 38.2 | 50 | 1 | 0.5 |
| 2.0 | −8 | 16 | 2 | 153 | 153 | 38.2 | 50 | 1 | 0.5 |
| 2.5 | −10 | 20 | 2 | 153 | 153 | 38.2 | 50 | 1 | 0.5 |

The operation of the circuit is clearly illustrated in the above example wherein a positive shift is illustrated. By reversing the polarities of $E_1$ and $E_2$, negative shifts can be achieved. As stated previously, it will be noted that once the K factor and the three resistances $R_1$, $R_2$, and $R_3$ are computed, additional level shifts may be obtained by concurrently changing $E_1$ and $E_2$.

Figure 5:
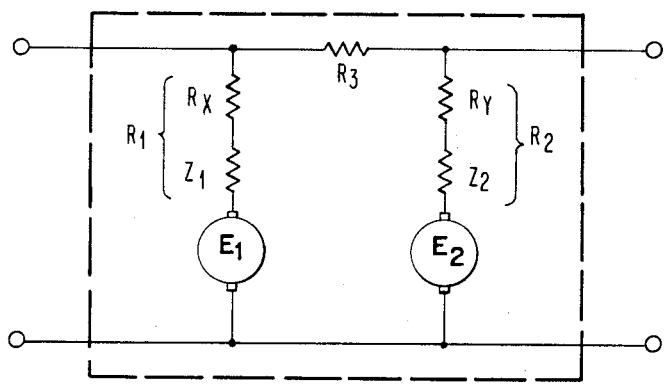
FIG. 5 is an equivalent circuit diagram of a level shifter of the present invention with an alternative form of power source in each of the legs of the shifter.
Figure 6:
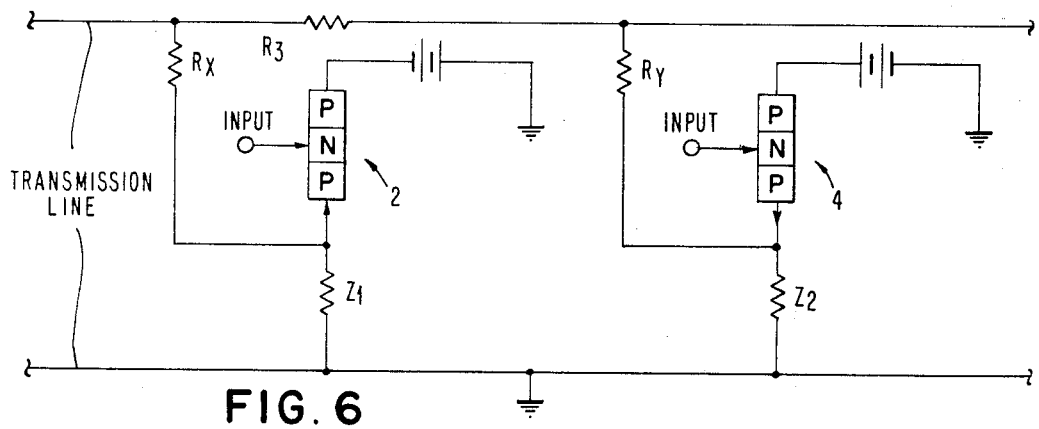
FIG. 6 is a schematic diagram illustrating in simplified form emitter-follower amplifier stages suitable for use as the power sources of the embodiment of the invention disclosed in FIG. 5.

A modification of the level shifting circuitry set forth in FIG. 3 is shown in FIG. 5. In the figure, the equivalent circuits of power sources $E_1$ and $E_2$ with finite internal impedances are shown. In the embodiment of FIG. 3 it is assumed that the two sources have no significant internal impedance, however, in the embodiment of FIG. 5 it is assumed that each of the sources have a finite amount of resistance indicated by the impedances $Z_1$ and $Z_2$ respectively. Such a situation would be present in, for example, an emitter-follower circuit. A simplified version of such an emitter-follower circuit is shown in FIG. 6. In the circuit of FIG. 6 the current flowing through the cathode follower resistor $Z_1$ is determined primarily by the magnitude of the input voltage applied to the base region of the transistor. This current in turn determines the voltage across the cathode follower resistor $Z_1$ and is the voltage which is supplied to the shifting network. In this embodiment the values of the leg resistors are $R_1$ and $R_2$ and comprise sum of the resistance $R_X$ plus the source impedance of the emitter-follower circuit 2 and $R_Y$ plus the source impedance of the emitter-follower circuit 4. It is apparent that the source impedance of the emitter-follower circuit 2 is substantially fixed, therefore, the resistance $R_X$ must be determined by first computing the value for the resistor $R_1$ using Formula 1 and subsequently, subtracting the value of said source impedance from this calculated value. Obviously, the value of the resistance $R_Y$ is computed relative to the source impedance of emitter-follower circuit 4 in the same manner. By source impedance is meant the impedance of the amplifier stage when looking into its output terminals. In the case of the emitter-follower of FIG. 6, it is the impedance seen across the resistor $Z_1$. As will be appreciated, the source impedance of an emitter-follower is a function of the resistance $Z_1$ and many other factors specific to the exact transistor and signal source used. Formulas for determining this impedance are well known and available in any transistor circuit text. While an emitter-follower is advantageous for the power supply due to its relatively low source impedance this does not exclude the use of a conventional amplifier stage with the load resistor in the collector circuit. In this latter case, the source impedance for the particular stage would have to first be calculated in order to select the proper value for the resistors $R_X$ and $R_Y$.

The advantage of utilizing an emitter-follower type of circuit for the sources $E_1$ and $E_2$ is that such circuits have a considerably faster response than programmable power supplies to changes in the input signal when it is desired to change the level shift $E_O$. Thus, the emitter-follower configuration of FIG. 6 has the advantage of a faster response time, however, it suffers from poorer regulation compared to quality power supplies. It will be readily understood that with such a level shifter it is desirable to be able to shift levels within a time compatible with the circuitry with which the shifter is being used. Thus, with modern semiconductor circuitry changes in the magnitude of level shift in the nanosecond range are feasible.

Figure 7:
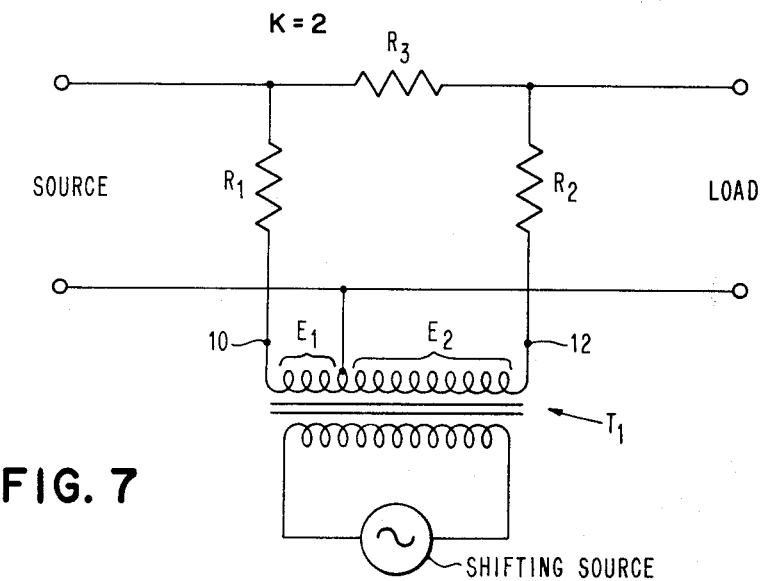
FIG. 7 is a schematic diagram of an alternative embodiment of the invention utilized as a combinatorial circuit.

A third embodiment of the system is illustrated in FIG. 7. In this embodiment the sources $E_1$ and $E_2$ are replaced by the tapped secondary of a transformer $T_1$. The two voltage sources are indicated by the brackets and again labeled $E_1$ and $E_2$ to conform with the previously described embodiment. As is well known, the ratio of $E_1$ to $E_2$ in this configuration will remain constant and the voltages at points 10 and 12 are of opposite polarity. Thus, a level shift varying at the A.C. rate of the shifting source is accomplished.

Figure 8A:
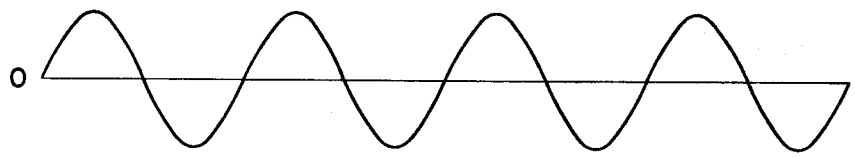
FIGS. 8a–8c are curves illustrating the operation of the circuit of FIG. 7.
Figure 8B:
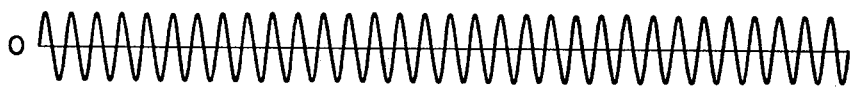
Figure 8C:
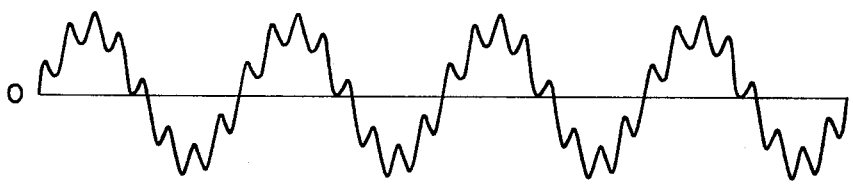

This is illustrated in FIGS. 8a–8c wherein the curve of FIG. 8a represents the shifting source signal and the curve of FIG. 8b represents the principle source. The curve of FIG. 8c represents the combined signals which would be seen at the lead. The curves of FIGS. 8a–8c assume $K = 2$.

The combinatorial circuit of FIG. 7 is the equivalent of a Kirchoff adder.

While sources for the voltages $E_1$ and $E_2$ comprising D.C. power supplies, emitter-follower stages, and a center tapped transformer have been disclosed and specifically described, it should be understood that other sources such as simple batteries, grounded base and grounded emitter amplifier stages, etc., would function satisfactorily provided the proper voltage across the output terminals of the source device is provided and appropriate calculations made to determine the source impedance. Further, a single power supply could be adapted to supply power to a tapped voltage divider resistor wherein the tap is connected to the common side of the transmission line and opposite ends of the resistor are connected to the resistors $R_1$ and $R_2$. Thus, two selectively variable opposite polarity power sources are provided.

Further, while a pi attenuator configuration has been disclosed, other double legged attenuator networks may be used such as a double T wherein the resistors employed must be substantially nonreactive. The calculations for the resistance ratios and voltage ratios for the two sources will be apparent from the previous description of the pi configuartion attenuator.

Having set forth the various objects, features, and advantages of the present invention, it will be apparent that the level shifting network exemplified by the disclosed embodiments of the present invention, while relatively straightforward in concept, provides a working device which has the enumerated advantages of being selectively variable and has an exceptionally wide band pass. The circuit is thus extremely useful as an interface or input device for various testing apparatus wherein the feature of ready adjustability to match the D.C. level of an input source to the D.C. level requirements of the testing or utilization device is important. In an essentially static or nonvariable state the circuit is valuable for matching levels between circuit families wherein the D.C. level requirements are different.

While the invention has been particularly shown and

What is claimed is:

1. A level shifting network for insertion in a transmission line between a source and a load wherein the transmission line impedance ($Z_O$), and the local impedance ($Z_L$) are substantally equal, said network defining a substantally non-reactive pi attenuator network comprising:
- a first resistance ($R_3$) in series with one side of the transmission line,
- a second resistance ($R_1$) in series with a first power source ($E_1$) connected across said transmission line at the end of said first resistance closest to the source,
- a third resistance ($R_2$) in series with a second source ($E_2$) connected across said line at the end of said first resistance closest to said load, said two power sources being of opposite polarity, and
- means for concurrently varying said two voltage sources $E_1$ and $E_2$ when it is desired to change the offset voltage level.

2. A level shifting network for insertion in a transmission line between a source and a load wherein the transmisison line impedance ($Z_O$), and the load impedance ($Z_L$) are substantially equal, said network defining a substantially nonreactive pi attenuator network comprising:
- a first resistance ($R_3$) in series with one side of the transmission line,
- a second resistance ($R_1$) in series with a first power source ($E_1$) connected across said transmission line at the end of said first resistance closest to the source,
- a third resistance ($R_2$) in series with a second source ($E_2$) connected across said line at the end of said first resistance closest to said load, said two power sources being of opposite polarity,
- means for concurrently varying said two voltage sources $E_1$ and $E_2$ when it is desired to change the offset voltage level,
- wherein the values of the power sources $E_1$ and $E_2$ and the values of the resistances $R_1$, $R_2$, and $R_3$ satisfy the following equations when selected to produce a D.C. voltage offset in the shifting network of $E_O$:

$$R_1 = R_2 = Z_O \frac{K+1}{K-1}$$

$$R_3 = Z_O \frac{K^2-1}{2K}$$

$$\frac{E_2}{E_1} = -K$$

$$E_1 = -2E_O \frac{K}{(K-1)^2}$$

3. A level shifting network as set forth in claim 2 wherein the two power sources ($E_1$ and $E_2$) are variable and including:
- means to vary said voltage sources concurrently whenever it is desired to change the offset voltage $E_O$ wherein the ratio of $E_2/E_1 = -K$ is maintained.

4. A level shifting network as set forth in claim 3 wherein the power sources are programmable D.C. power supplies.

5. A D.C. level shifting network as set forth in claim 3 wherein said variable D.C. power supplies comprise:
- amplifier stages wherein the source impedances of the amplifier stages are included in the computation of the value of the resistances $R_1$ and $R_2$.

6. A D.C. level shifting network as set forth in claim 3 wherein the variable D.C. power sources comprise:
- emitter-follower amplifier stages wherein the emitter-follower resistors are a portion of the source impedance of said stages and are included in the computation of the resistances $R_1$ and $R_2$.

7. A level shifting network as set forth in claim 2 wherein the two power sources ($E_1$ and $E_2$) comprise:
- the two sides of a tapped secondary winding of a transformer wherein opposite ends of the transformer winding are connected to said second and third resistance and the center tap is connected to the opposite side of said transmission line from said first resistance, and
- means for applying an A.C. signal to the primary winding of said transformer.

References Cited

UNITED STATES PATENTS 3,123,746  3/1964  Wachowiak ........ 317—148.5
3,188,554  6/1965  Reid ................ 323—74

ARTHUR GAUSS, *Primary Examiner.*

S. D. MILLER, *Assistant Examiner.*